United States Patent
Sutardja

(10) Patent No.: US 6,856,163 B2
(45) Date of Patent: Feb. 15, 2005

(54) POWER SUPPLY DECOUPLING FOR PARALLEL TERMINATED TRANSMISSION LINE

(75) Inventor: Sehat Sutardja, Los Altos Hills, CA (US)

(73) Assignee: Marvell World Trade Ltd., Hamilton (BM)

( * ) Notice: Subject to any disclaimer, the term of this patent is extended or adjusted under 35 U.S.C. 154(b) by 106 days.

(21) Appl. No.: 10/271,664

(22) Filed: Oct. 15, 2002

(65) Prior Publication Data

US 2004/0056678 A1 Mar. 25, 2004

Related U.S. Application Data

(60) Provisional application No. 60/413,891, filed on Sep. 25, 2002.

(51) Int. Cl.[7] .............................................. H03K 17/16
(52) U.S. Cl. ......................... 326/30; 327/322; 375/257
(58) Field of Search ............................ 326/30, 86, 90; 327/311; 375/257

(56) References Cited

U.S. PATENT DOCUMENTS 5,239,559 A * 8/1993 Brach et al. ................. 375/257
6,011,419 A 1/2000 Nowak et al.
2002/0008053 A1 1/2002 Osaka et al.

FOREIGN PATENT DOCUMENTS

GB 2286953 A 8/1995

OTHER PUBLICATIONS

Communication pursuant to Article 96(2) EPC for European Application No. 03017479.1, entitled, "Power Supply Decoupling For Parallel Terminated Transmission Line". Sep. 20, 2004.

* cited by examiner

Primary Examiner—Daniel D. Chang

(57) ABSTRACT

An interconnect circuit for communicating data. The interconnect circuit including at least one driver to receive and transmit data. At least one termination device in communication with each driver. A first power supply having an output to supply power to the driver. A second power supply having an output to supply power to the termination device. A first decoupling capacitor in communication with the first power supply output and the second power supply output.

33 Claims, 2 Drawing Sheets

POWER SUPPLY DECOUPLING FOR PARALLEL TERMINATED TRANSMISSION LINE

CROSS-REFERENCE TO RELATED APPLICATIONS

This application claims the benefit of the filing date of U.S. provisional application No. 60/413,891 filed Sep. 25, 2002, the content of which is herein incorporated by reference in its entirety.

TECHNICAL FIELD

An aspect of this invention relates to power systems for high-frequency interconnect circuits.

BACKGROUND

Today's electronics systems contain many complex integrated circuits operating at very high clock frequencies. Already today the data rates on the chip-to-chip interconnects operate at more than 300 Mb/s. It is expected that these data rates will approach 1 Gb/s in the next few years. At these data rates, chip-to-chip interconnects behave like RF transmission lines. As such, proper termination is a must. For longer distance interconnects, parallel termination is often used. Some well known examples include CPU to North Bridge chip interconnect, North Bridge to DDR (Double Data Rate SDRAM) memory interconnect and Graphic processor to DDR memory.

As the width of interconnects gets wider, the amount of power needed to operate these transmission lines may become one of the largest power users of the systems. For example, an advanced graphic processor today may use a 256 bit wide interconnect to the DDR memory. The amount of current flowing through the termination resistors is so staggering that DC/DC converters are often used to provide the termination voltage.

Conventional DC/DC converters typically do not provide fast enough response to the changing demand of the termination current. Even for interfaces running at 300 Mb/s data rates, the current loading may transition from almost zero to full power and back to zero in a matter of a few clock cycles when all of the data bits switch from zeroes to ones and back to zeroes. The problem that faces the DC/DC power supply for the termination voltage is also encountered at the DC/DC power supply for the driver circuits that drive the transmission line.

FIG. 1 shows a conventional driver power system 10 that includes a driver power supply, $V_{DDQ}$, 12 and capacitor 13 to supply energy to high speed line drivers 14 (one of many shown), and a termination power supply, $V_{TT}$, 16 and capacitor 15 to supply energy to termination devices 18.

In operation, the drivers 16 draw current from the driver power supply 12 as a function of the state of the data lines 19. Small currents flow when all or most of the data lines are in the low state. When most of the data lines are in the high state, a large DC load current flows. During a high load current mode, the current flows from the $V_{DDQ}$ power supply 12 through the termination resistors 18, and into the termination power supply 16, which sinks the current. The current flowing into the $V_{TT}$ power supply 16 from the $V_{DDQ}$ power supply 12 is negative and about one-half the magnitude of the current flowing out of the $V_{DDQ}$ power supply 12.

When the data lines 19 switch to the low state, the current from the $V_{DDQ}$ power supply 12 to the termination resistors 18 virtually immediately decreases to zero. This causes the voltage output from the $V_{DDQ}$ power supply 12 to spike upwards, causing the $V_{DDQ}$ power supply to transition to an emergency transient recovery mode to protect the power supply output from increasing beyond the voltage regulation limits. Almost simultaneously, the current through the $V_{TT}$ power supply 16 reverses in direction, causing the voltage of the $V_{TT}$ power supply 16 to spike downwards, sending the $V_{TT}$ power supply 16 into an emergency transient recovery mode to prevent the $V_{TT}$ power supply voltage from decreasing below the voltage regulation limits. The emergency $V_{TT}$ emergency transient recovery operation in return may cause a huge transient current to flow back into the $V_{DDQ}$ power supply 12, further exasperating the voltage spike at the output of the $V_{DDQ}$ power supply 12. The magnitude of the power supply fluctuations during the transient load changes may be decreased by employing high speed DC/DC converters for the $V_{TT}$ and $V_{DDQ}$ power supplies 12 and 16. However, the magnitude of the power supply fluctuations may still be significant and high speed DC/DC converters are generally very costly.

SUMMARY

An interconnect circuit for communicating data. The interconnect circuit including at least one driver to receive and transmit data. At least one termination device in communication with each driver. A first power supply having an output to supply power to the driver. A second power supply having an output to supply power to the termination device. A first decoupling capacitor in communication with the first power supply output and the second power supply output.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
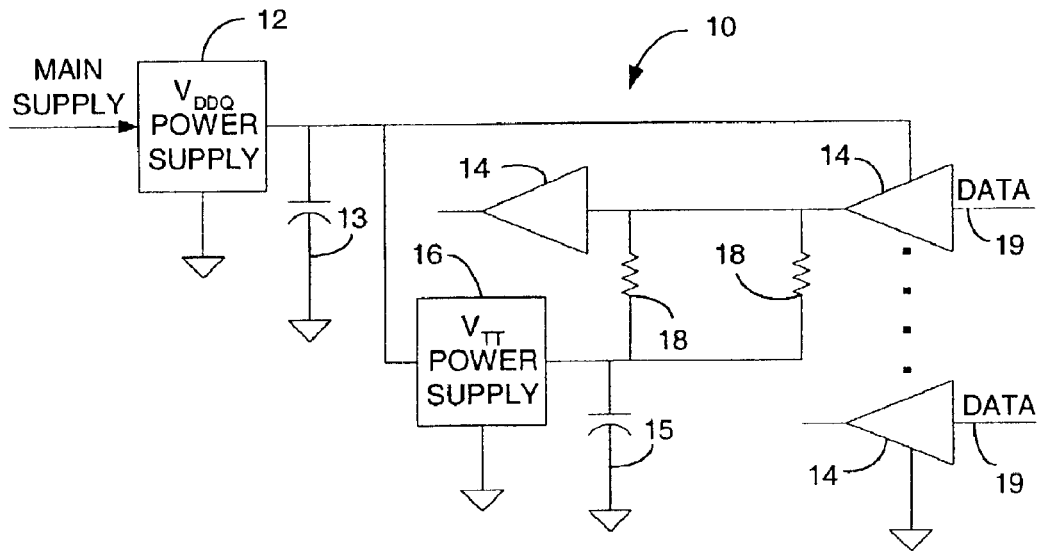
FIG. 1 is a block diagram of a conventional high-frequency interconnect circuit.
Figure 2:
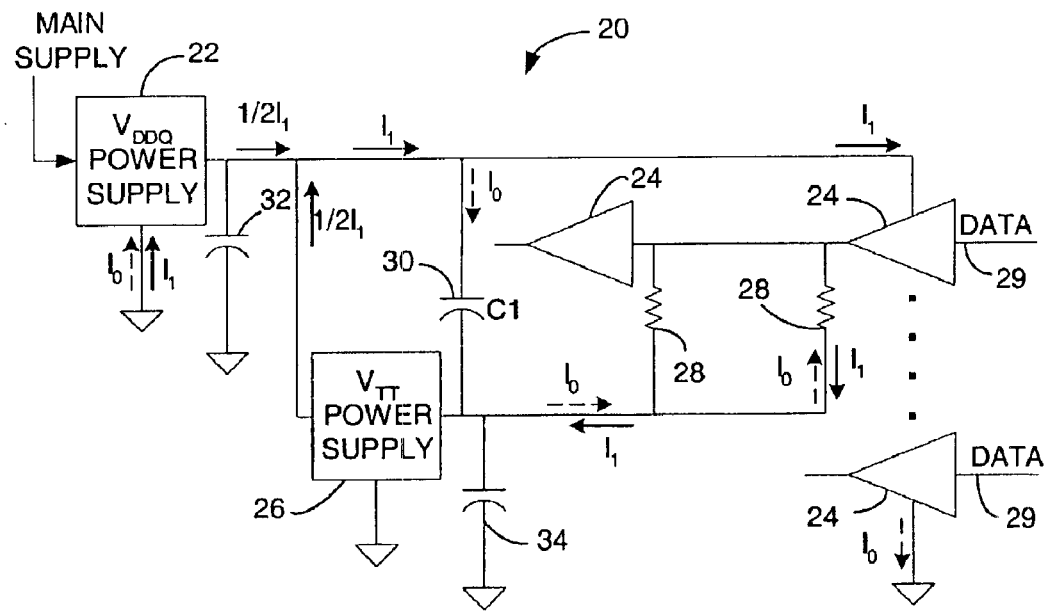
FIG. 2 is a block diagram of an aspect of a high-frequency interconnect circuit.

FIG. 2 shows an aspect of a power system 20 for supplying power to one or more high-speed drivers 24. The drivers 24 may be employed in interconnect systems that operate at data rates where interconnections may behave as transmission lines. A driver power supply 22 with a filter capacitor 32 may supply power to the high-speed drivers 24. A termination power supply 26 with a filter capacitor 34 may supply power to the termination devices 28.

The present invention recognizes that the transient load response of the power system 20 may be dramatically improved by connecting a decoupling capacitor, C1, 30 between the $V_{TT}$ power supply 26 and the $V_{DDQ}$ power supply 22. In addition, the size of the filter capacitors 32 and 34 between ground and the power supplies 22 and 26 may be greatly reduced or eliminated. The capacitance of the decoupling capacitor 30 may be equal to or much greater than the capacitance of the filter capacitor 34. Intuitively, this would seem to aggravate the power supply output voltage glitch problem. However, including the decoupling capacitor 30 actually may drastically reduce any need for using very high speed DC/DC converters and the size of the filter capacitors 32 and 34. In fact, including the decoupling capacitor 30 may simultaneously solve the power regulation problems seen by both the $V_{DDQ}$ and $V_{TT}$ power supplies 22 and 26. The decoupling capacitor 30 may be any type of high-frequency capacitance device such as ceramic capacitors, silicon-based capacitors, and the like.

Figure 3:
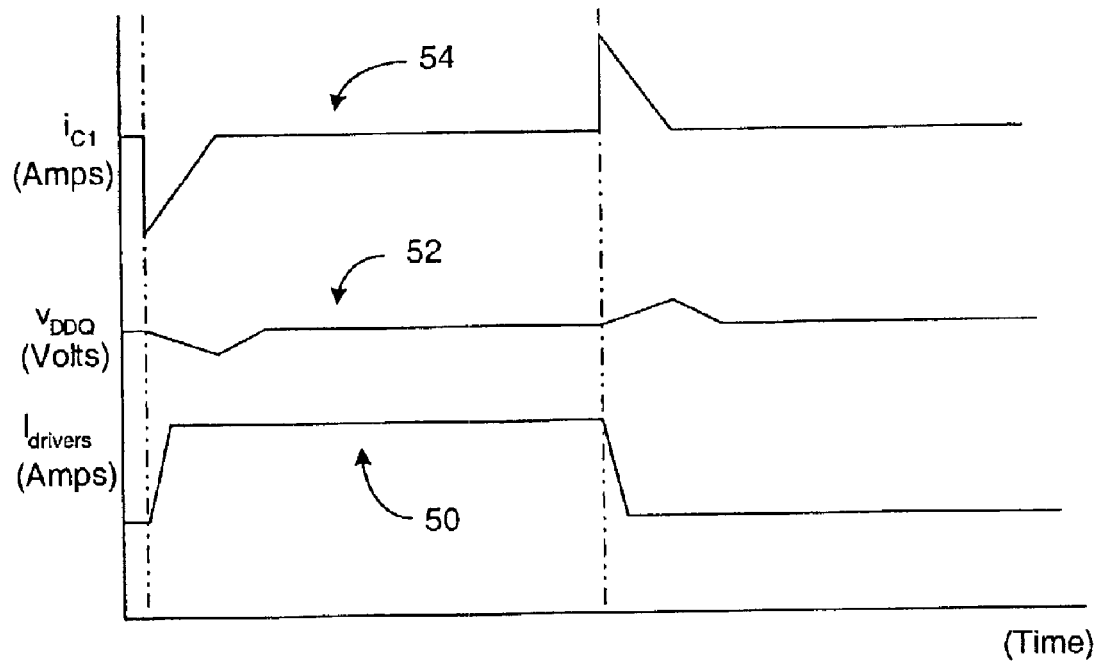
FIG. 3 shows waveforms associated with an aspect of a high-frequency interconnect circuit.

FIG. 3 shows waveforms associated with the operation of an aspect of the power system 20. A first waveform 50 shows the current flowing into the drivers 24. A second waveform 52 shows the output voltage of the VDDQ power supply 22. A third waveform 54 shows the current flowing through the decoupling capacitor, C1, 30.

In operation, when the data on the data lines 29 is all or mostly ones, a large DC current, $I_1$, flows from the $V_{DDQ}$ power supply 22 to the drivers 24 and through the termination resistors 28 to the $V_{TT}$ power supply 26. About half of the DC current flows back from the $V_{TT}$ power supply 26 to the $V_{DDQ}$ power supply 22.

When the data switches to all or mostly zeroes, the current flowing into the drivers 24 almost instantly decreases to zero. However, the current flowing from the $V_{DDQ}$ power supply 22 may not immediately decrease to zero due to limitations of the power supply 22 such as parasitic inductances and a finite transient load response. The decoupling capacitor 30 provides a transient current path, $I_0$, for the current flowing from the $V_{DDQ}$ power supply 22. The current flows from the $V_{DDQ}$ power supply 22, through the decoupling capacitor 30, through the termination resistors 28, and finally through the drivers 24. As the output voltage of the $V_{TT}$ power supply 22 begins to drift upwards due to the finite value of the decoupling capacitor 30, the $V_{TT}$ power supply 26 starts to respond. Since the decoupling capacitor 30 provides an alternate current path, the $V_{TT}$ power supply 22 does not have to respond as fast to load current changes to prevent output voltage spikes. Also, since the $V_{TT}$ power supply 26 is able to respond slower to load changes than in power systems that do not include the decoupling capacitor 30, the $V_{DDQ}$ power supply 22 does not have to respond as fast to load changes either.

Figure 4:
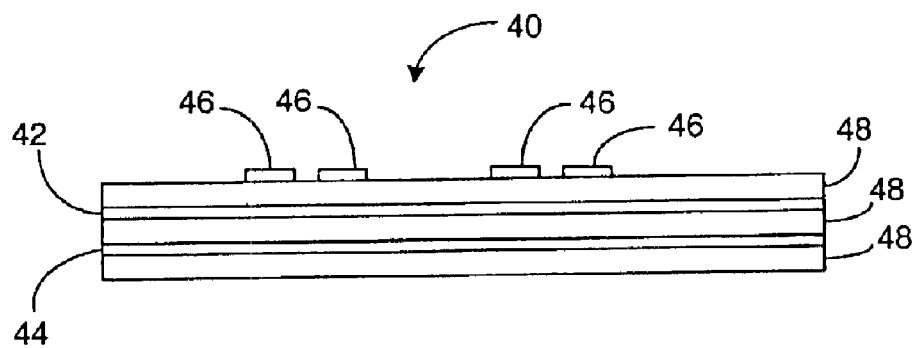
FIG. 4 is a two-dimensional view of an aspect of a high-frequency interconnect circuit mounted on a printed circuit board (PCB).

The power system 20 is preferably implemented on an assembly 40 such as a printed circuit board (PCB) as shown in FIG. 4. The assembly 40 may include a $V_{TT}$ power plane 42 and a $V_{DDQ}$ power plane 44 to distribute power from the $V_{TT}$ and $V_{DDQ}$ power supplies 22 and 26 respectively. The $V_{TT}$ power plane 42 is preferably laid next to the $V_{DDQ}$ power plane 44. Insulating layers 48 may separate the power planes 42 and 44. Arranging the $V_{TT}$ power plane 42 next to the $V_{DDQ}$ power plane 44 may advantageously increase the distributed capacitance between $V_{TT}$ and $V_{DDQ}$ adding further capacitance in shunt with the decoupling capacitor 30.

In conventional power systems, the $V_{TT}$ power plane is typically referred to a ground plane leading to an increase in the distributed capacitance between the $V_{TT}$ power plane and the ground plane, but almost no increase between the $V_{TT}$ power plane and the $V_{DDQ}$ power plane.

Data lines 46 on the PCB 40 may also be routed adjacent to the $V_{TT}$ power plane 44 to indirectly increase the effective decoupling capacitance 30. The data lines 46 may be formed on a signal layer that is adjacent to the $V_{TT}$ power plane 44. The data lines 46 may also be formed as a portion of the $V_{TT}$ power plane 44.

A number of embodiments of the invention have been described. Nevertheless, it will be understood that various modifications may be made without departing from the spirit and scope of the invention. Accordingly, other embodiments are within the scope of the following claims.

What is claimed is:

1. An interconnect circuit for communicating data, comprising:
    at least one driver to receive and transmit data;
    at least one termination device in communication with each driver;
    a driver power supply having an output to supply power to the driver;
    a termination power supply having an output to supply power to the termination device; and
    a first decoupling capacitor connected between the driver power supply output and the termination power supply output.

2. The interconnect circuit of claim 1 wherein the driver power supply output is referenced to ground; and
    further including a first filter capacitor connected between the driver power supply output and ground.

3. The interconnect circuit of claim 1 assembled on a printed circuit board.

4. The interconnect circuit of claim 3 wherein the printed circuit board includes;
    a first power layer including a first power conductor to distribute power from the driver power supply; and
    a second power layer including a second power conductor to distribute power from the termination power supply, the second power conductor arranged opposing the first powerconductor.

5. The interconnect circuit of claim 4 wherein the printed circuit board includes data lines to communicate signals to the driver, the data lines arranged on a signal layer opposing the second power layer.

6. The interconnect circuit of claim 1 wherein the driver includes a power input, a signal input, and a signal output;
    the driver power supply output is connected to the power input of the driver; and
    the termination device is connected between the output of the termination power supply and one of the signal output or the signal input of the driver.

7. The interconnect circuit of claim 1 further comprising a plurality of drivers; and
    termination devices corresponding to each of the plurality of drivers.

8. An interconnect circuit for communicating data, comprising:
    means for buffering data;
    means for impedance matching in communication with each means for buffering data;
    driver means for supplying power to the means for buffering data;
    termination means for supplying power in communication with the means for impedance matching; and
    a first decoupling capacitor connected between the driver means for supplying power and the termination means for supplying power.

9. The interconnect circuit of claim 8 wherein the driver means for supplying power is referenced to ground; and
    further including a first means for filtering connected between the driver means for supplying power and ground.

10. The interconnect circuit of claim 8 assembled on a printed circuit board.

11. The interconnect circuit of claim 10 wherein the printed circuit board includes;
   a first power layer including a first power conductor to distribute power from the driver means for supplying power; and
   a second power layer including a second power conductor to distribute power from the termination means for supplying power, the second power conductor arranged opposing the first powerconductor.

12. The interconnect circuit of claim 11 wherein the printed circuit board includes data lines to communicate signals to the buffering means, the data lines arranged on a signal layer opposing the second power layer.

13. The interconnect circuit of claim 8 wherein the buffering means includes a power input, a signal input, and a signal output;
   the driver means for supplying power is connected to the power input of the buffering means; and
   the means for impedance matching is connected between the output of the termination means for supplying power and one of the signal output or the signal input of the buffering means.

14. The interconnect circuit of claim 8 further comprising a plurality of means for buffering; and
   means for impedance matching corresponding to each of the plurality of means for buffering.

15. A method for communicating data over a transmission line, comprising:
   providing a driver to buffer the data, the driver having a power input;
   providing a termination device to impedance match the driver;
   supplying power to the power input of the driver;
   supplying power to the termination device; and
   forming a high-frequency current path between the power input of the driver and the termination device.

16. The method of claim 15 further comprising filtering power supplied to the driver and the termination device.

17. The method of claim 15 further comprising providing a printed circuit board to contain the interconnect circuit.

18. The method of claim 17 further comprising distributing power to the power input of the driver through a first powerconductor;
   distributing power to the termination device through a second powerconductor; and
   arranging the first power conductor opposing the second powerconductor.

19. The method of claim 18 further comprising forming data lines on the printed circuit board to communicate signals to the buffering means; and
   arranging the data lines opposing the second power layer.

20. The method of claim 19 wherein arranging the data lines includes forming the data lines on a signal layer.

21. The method of claim 18 wherein the first power conductor is included on a first layer and the second power conductor is included on a second layer.

22. The interconnect circuit of claim 1 wherein the termination power supply output is referenced to ground;
   further including a second filter capacitor having a capacitance, connected between the termination power supply output and ground; and
   the first decoupling capacitor having a capacitance at least equal to the second filter capacitor capacitance.

23. An interconnect circuit for communicating data, comprising:
   at least one driver to receive and transmit data;
   at least one termination device in communication with each driver;
   a first power supply having an output to supply power to the driver;
   a second power supply having an output to supply power to the termination device;
   a first decoupling capacitor connected between the first power supply output and the second power supply output; and
   a second filter capacitor having a capacitance, connected between the termination power supply output and ground, wherein the capacitance of the first decoupling capacitor is at least 10 times greater than the capacitance of the second filter capacitor.

24. The interconnect circuit of claim 8 wherein the termination means for supplying power is referenced to ground;
   further including a second filter capacitor having a capacitance, connected between the termination means for supplying power and ground; and
   the first decoupling capacitor having a capacitance at least equal to the second filter capacitor capacitance.

25. An interconnect circuit for communicating data, comprising:
   means for buffering data;
   means for impedance matching in communication with each means for buffering data;
   first means for supplying power to the means for buffering data;
   second means for supplying power in communication with the means for impedance matching;
   a first decoupling capacitor in communication with the first means for supplying power and the second means for supplying power; and
   a second filter capacitor having a capacitance, connected between the termination means for supplying power and ground, wherein the capacitance of the first decoupling capacitor is at least 10 times greater than the capacitance of the second filter capacitor.

26. The method of claim 16 wherein filtering the power supplied to the termination device includes providing a filter capacitor having a capacitance;
   wherein forming a high-frequency current path includes providing a decoupling capacitor having a capacitance; and
   selecting the capacitance of the decoupling capacitor to be at least equal to the capacitance of the filter capacitor.

27. A method for communicating data over a transmission line, comprising:
   providing a driver to buffer the data, the driver having a power input;
   providing a termination device to impedance match the driver;
   supplying power to the power input of the driver;
   supplying power to the termination device;
   filtering power supplied to the driver and the termination device; and
   forming a high-frequency current path between the power input of the driver and the termination device, wherein forming a high-frequency current path includes providing a first decoupling capacitor having a capacitance,
   wherein filtering the power supplied to the termination device includes providing a second filter capacitor having a capacitance, and wherein the capacitance of the first decoupling capacitor is at least 10 times greater than the capacitance of the second filter capacitor.

28. A method for communicating data over a transmission line, comprising:
providing a driver to buffer the data, the driver having a power input;
providing a termination device to impedance match the driver;
supplying power to the power input of the driver;
supplying power to the termination device;
filtering power supplied to the driver and the termination device; and
forming a high-frequency current path between the power input of the driver and the termination device, wherein forming a high-frequency current path includes providing a first decoupling capacitor having a capacitance,
wherein filtering the power supplied to the driver includes providing a first filter capacitor having a capacitance, and
wherein the first decoupling capacitor has a capacitance that is at least 10 times greater than a capacitance of the first filter capacitor.

29. The interconnect circuit of claim 1 wherein the driver power supply output is referenced to ground; and
wherein a first filter capacitor is not connected between the driver power supply output and ground.

30. An interconnect circuit for communicating data, comprising:
means for buffering data;
means for impedance matching in communication with each means for buffering data;
driver means for supplying power to the means for buffering data;
termination means for supplying power in communication with the means for impedance matching;
a first decoupling capacitor connected between the driver means for supplying power and the termination means for supplying power, and
a first means for filtering connected between the driver means for supplying power and ground,
wherein the first decoupling capacitor has a capacitance that is at least 10 times greater than a capacitance of the first means for filtering.

31. The interconnect circuit of claim 8 wherein the driver means for supplying power is referenced to ground; and
wherein a first means for filtering is not connected between an output of the driver means for supplying power and ground.

32. The method of claim 16 wherein filtering the power supplied to the driver includes providing a driver filter capacitor having a capacitance and referenced to ground;
wherein forming a high-frequency current path includes providing a decoupling capacitor having a capacitance; and
selecting the capacitance of the decoupling capacitor to be at least ten times greater than the capacitance of the driver filter capacitor.

33. The method of claim 15 further comprising filtering with reference to ground the power supplied to the termination device; and
not filtering with reference to ground the power supplied to the driver.

* * * * *

UNITED STATES PATENT AND TRADEMARK OFFICE
CERTIFICATE OF CORRECTION

PATENT NO. : 6,856,163 B2  Page 1 of 1
APPLICATION NO. : 10/271664
DATED : February 15, 2005
INVENTOR(S) : Sehat Sutardja It is certified that error appears in the above-identified patent and that said Letters Patent is hereby corrected as shown below:

| | |
|---|---|
| Title Page | Delete "2002/0008053" and insert --2002/0008539A1-- |
| Column 3, Line 15 | Delete "VDDQ" and insert --$V_{DDQ}$-- |
| Column 4, Line 33 | Delete "powerconductor" and insert --power conductor-- |
| Column 5, Line 11 | Delete "powerconductor" and insert --power conductor-- |
| Column 5, Line 47 | Delete "powerconductor" and insert --power conductor-- |
| Column 5, Line 49 | Delete "powerconductor" and insert --power conductor-- |
| Column 5, Line 51 | Delete "powerconductor" and insert --power conductor-- |

Signed and Sealed this

Twenty-third Day of January, 2007

JON W. DUDAS
*Director of the United States Patent and Trademark Office*